(12) United States Patent
Chaar et al.

(10) Patent No.: US 7,729,920 B2
(45) Date of Patent: *Jun. 1, 2010

(54) SYSTEMS AND METHODS FOR PREDICTING CONSEQUENCES OF MISINTERPRETATION OF USER COMMANDS IN AUTOMATED SYSTEMS

(75) Inventors: Jarir Kamel Chaar, Tarrytown, NY (US); Dimitri Kanevsky, Ossining, NY (US); Roberto Sicconi, Ridgefield, CT (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 12/103,560

(22) Filed: Apr. 15, 2008

(65) Prior Publication Data

US 2008/0215516 A1 Sep. 4, 2008

Related U.S. Application Data

(63) Continuation of application No. 11/044,316, filed on Jan. 27, 2005, now Pat. No. 7,437,297.

(51) Int. Cl.
*G10L 15/22* (2006.01)
(52) U.S. Cl. .................................... 704/275
(58) Field of Classification Search ............... 704/275
See application file for complete search history.

(56) References Cited

U.S. PATENT DOCUMENTS 7,437,297 B2 * 10/2008 Chaar et al. ................. 704/275

\* cited by examiner

*Primary Examiner*—Susan McFadden

(57) ABSTRACT

Systems and methods are provided for processing and executing commands in automated systems. For example, command processing systems and methods are provided which can automatically determine, evaluate or otherwise predict consequences of execution of misrecognized or misinterpreted user commands in automated systems and thus prevent undesirable or dangerous consequences that can result from execution of misrecognized/misinterpreted commands.

11 Claims, 4 Drawing Sheets

SYSTEMS AND METHODS FOR PREDICTING CONSEQUENCES OF MISINTERPRETATION OF USER COMMANDS IN AUTOMATED SYSTEMS

CROSS-REFERENCE TO RELATED APPLICATION

This is a Continuation Application of U.S. application Ser. No. 11/044,316 filed on Jan. 27, 2005, now U.S. Pat. No. 7,437,297 the disclosure of which is herein incorporated by reference in its entirety.

TECHNICAL FIELD OF THE INVENTION

The invention relates generally to automated systems that implement recognition systems and methods such as speech recognition and speaker identification, for example. More specifically, the invention relates to recognition systems and methods, which can automatically determine, evaluate or otherwise predict consequences of execution of misrecognized/ misinterpreted user commands in automated systems and thus prevent undesirable or dangerous consequences that can result from execution of misrecognized/misinterpreted commands.

BACKGROUND

Technological innovations in speech processing and other types of automated pattern recognition systems have led to widespread development and employment of automated intelligent systems such as IVR (interactive voice response) on-line services (e.g., banking), automated user identification (facial, fingerprint, speaker identification) for secured access to services and locations, voice-controlled systems for various environments (e.g., car, home, office, etc.) and various other systems.

Speech recognition system and/or natural language understanding can be implemented in automated system to enable conversational interaction with the automated system and allow a user to utter voice commands or queries that are automatically recognized, interpreted and executed by the system. For example, speech recognition may be implemented in car environments to allow a driver to provide commands via voice.

One problem with speech recognition and other recognition system is that such systems can make errors that result in undesirable or dangerous consequences. For instance, a speech recognition system in a car control application can misinterpret a driver command and thus activate the wrong command which can endanger the safety of the driver. For example, assume that a driver utters a command to "open a window" and that the car control system also has voice commands that can stop a car. If the system miss-recognized the voice command to "open a window" as the command to "stop the car", such decoding mistake can lead to dangerous results as causing an accident if the driver did not intend to stop the car.

By way of further example, miss-recognition of a caller's request by a natural language understanding system installed at a bank center can result in undesirable consequences such as transferring money to a wrong account. Moreover, similar problems exist with respect to recognition errors in visual recognition systems. For example, in military applications, if a visual recognition system is designed to recognize enemy airplanes, if misrecognition occurs, the error can be fatal e.g., the military can shoot down a misrecognized friendly airplane.

Recently, research and development has began to develop systems that can identify driver states (angry, stressful, tired), predict driver behavior and situations (like whether a driver will cross a middle road line), and cognitive driver workload. The recognition of such situations is especially difficult and problematic, and recognition errors in such applications can lead to fatal consequences for drivers.

SUMMARY OF THE INVENTION

Exemplary embodiments of the invention include recognition systems and methods, which can automatically determine, evaluate or otherwise predict consequences of execution of misrecognized/misinterpreted user commands in automated systems and thus prevent undesirable or dangerous consequences that can result from execution of misrecognized/misinterpreted commands. In general, exemplary methods are provided to evaluate consequences of executing commands that are deemed to be ambiguous (possible misrecognized commands). If a potentially misrecognized command can result in undesirable, bad or dangerous consequences, user confirmation may be obtained regarding the intended command, or other additional information (if available) can be processed to confirm or otherwise verify if the command was correctly recognized/interpreted.

More specifically, in one exemplary embodiment of the invention, a method for processing commands in an automated system includes receiving a user command, processing the user command, evaluating consequences of executing the user command based on command processing results, and performing a preventative action if it is determined that execution of the user command could result in an undesirable consequence.

In another exemplary embodiment of the invention, an automated system comprises a command processing system that processes input commands, and a command execution system that executes an input command based on command processing results provided by the command processing system, wherein the command processing system is adapted to evaluate consequences of executing input commands and take preventative actions for execution of input commands that could result in undesirable consequences.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary embodiments of the invention as described in detail hereafter generally include systems and methods for processing and executing commands in automated systems. For example, exemplary embodiments of the invention include recognition systems and methods which can automatically determine, evaluate or otherwise predict consequences of execution of misrecognized or misinterpreted user commands in automated systems and thus prevent undesirable or dangerous consequences that can result from execution of misrecognized/misinterpreted commands.

It is to be understood that the systems and methods described herein may be implemented in various forms of hardware, software, firmware, special purpose processors, or a combination thereof. For example, exemplary embodiments of the invention can be implemented in software as an application comprising program instructions that are tangibly embodied on one or more program storage devices (e.g., hard disk, magnetic floppy disk, RAM, CD ROM, ROM and Flash memory) and executable by any device or machine comprising suitable architecture. It is to be further understood that since the constituent system modules and method steps depicted in the accompanying Figures may be implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Figure 1:
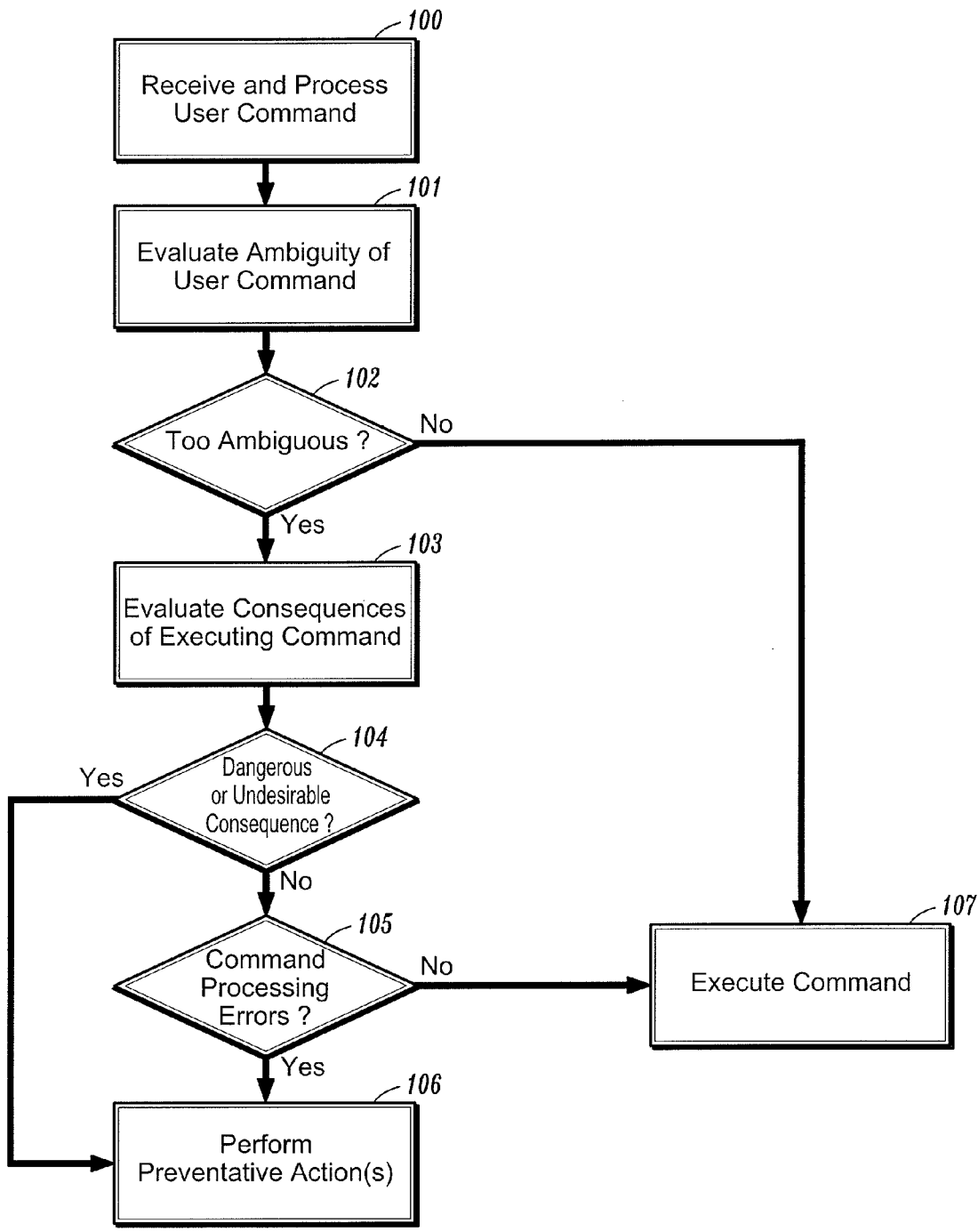
FIG. 1 is a flow diagram illustrating a method for processing user commands in an automated system according to an exemplary embodiment of the invention.

FIG. 1 is a flow diagram that illustrates a method for processing user commands in an automated system according to an exemplary embodiment of the invention. The method of FIG. 1 can be implemented in any automated or conversational system, for example, that receives and interprets user commands or requests (e.g., user voice commands) and executes functions associated with the interpreted commands. For instance, exemplary methods described herein can be implemented with speech recognition or natural language understanding systems that process voice commands or spoken user dialog.

Referring to FIG. 1, an automated system receives and processes a user command or some other input data to be processed (step 100). For example, the user command may be a voice command for performing some transaction using an on-line banking service or a command for performing some automated function in a car. Moreover, for visual recognition applications, the processing step may involve capturing an image of an object or facial features of a person and performing some pattern recognition and interpretation process.

Next, the system will automatically evaluate the ambiguity or confusability of the command (step 101). More specifically, by way of example, the system can implement a method for determining a measure of confidence or likelihood that the results of processing/interpreting the user command or input data are accurate. For example, with speech recognition, the results of processing a voice command can be an n-best list that provides the n most likely recognition/interpretation results for the command together with a confidence measure. In such instance, the system can evaluate ambiguity of the processing results based on the confidence measure of the most-likely result as compared to other alternative results, if any. It is to be understood that the evaluation method can vary depending on the type of recognition system implemented and the given application.

If the ambiguity evaluation method determines that the command is not too ambiguous (negative determination in step 102), the system can execute the command (step 107). On the other hand, if the evaluation method determines that the command is too ambiguous (affirmative determination in step 102), the system will proceed to evaluate the consequences of executing the command (step 103). More specifically, by way of example, the consequences evaluation process will determine whether execution of the command (having the highest measure/degree of confidence) will result in good or desirable consequences, or undesirable, bad or dangerous consequences. In accordance with exemplary embodiments of the invention, a consequence evaluation process can be based on various factors such as hypothetical results or hypothetical results evaluated in real-time against actual environmental conditions. The evaluation process will vary depending on the application environment.

For example, in a banking application, the consequences of executing an ambiguous user command to transfer money from the user's account to another account may be deemed "desirable" if the other account is the user's own account, or deemed "undesirable" if the other account was not associated with the user. Moreover, such consequence evaluation may be based on real-time conditions such as the amount of money being transferred, wherein an ambiguous command to transfer a small amount of money to another's account may be deemed "desirable" whereas an ambiguous command for transferring a large amount of money to another's account may be deemed "undesirable". By way of further example, for an application that enables automated control in a car, an ambiguous command to "stop the car" may be deemed "undesirable" or "dangerous" given hypothetical consequences of stopping the car such as being hit from behind or skidding off the road. However, if real-time conditions are considered such as speed of the car, the existence of a moving vehicle behind the user's car within some range, and/or road conditions (wet or dry), the consequences of stopping the car may not be deemed dangerous or bad in view of real-time environmental conditions such as, slow speed of car, dry road conditions, and/or no moving vehicle close behind car.

Referring again to FIG. 1, if it is determined that the consequence(s) of executing an ambiguous command are "dangerous", "bad" or otherwise "undesirable" (affirmative determination in step 104), the system can perform one or more preventative actions (step 106). In accordance with exemplary embodiments of the invention, preventative actions include, for example, temporarily suspending execution of the command and providing some feedback or query to the user to verify or otherwise obtain user confirmation to execute the command or suggest potential alternative interpretations of the command which may have been intended by the user, providing notification or alerts or some form of feedback to the user (or others) regarding the consequences of executing the command and/or simply rejecting the command (even if confirmed) if the command is not executable or if the consequences of executing the demand would be extremely dangerous or highly undesirable according to some impact measure.

If it is determined that the consequence(s) of executing an ambiguous command are not dangerous or otherwise undesirable (negative determination in step 104), the system can proceed to determine if there were processing errors resulting in ambiguous results (step 105). This process can be implemented in various manners. For instance, the system can automatically verify the user's intent by processing other available information that may be relevant in determining the user's intent. For example, the recognition results of the user command can be verified by using a more expensive and more accurate recognition technique to process the user's command. For example, if the system initially used some fast match recognition technique to decode a speech utterance, the system can proceed to decode the utterance again using a more accurate (though more expensive or time consuming) decoding technique.

Referring again to FIG. 1, if it is determined that no dangerous or undesirable consequences could result from executing the command (negative determination in step 104) and that there are no processing errors (negative determination in step 105), the system may proceed to execute the command (step 107). On the other hand, if no dangerous or undesirable consequences could occur and processing errors are found to exist (affirmative determination in step 105), the system may perform one or more preventative actions (step 106). In accordance with exemplary embodiments of the invention, preventative actions in such circumstances include, for example, temporarily suspending execution of the command and providing some feedback or query to the user to verify or otherwise obtain user confirmation to execute the command or suggest potential alternative interpretations of the command that may have been intended by the user, providing notification or alerts or some form of feedback to the user (or others) regarding the consequences of executing the command and/or simply rejecting the command if user confirmation or verification is not obtained or if the command (even if confirmed) is not executable.

Figure 2:
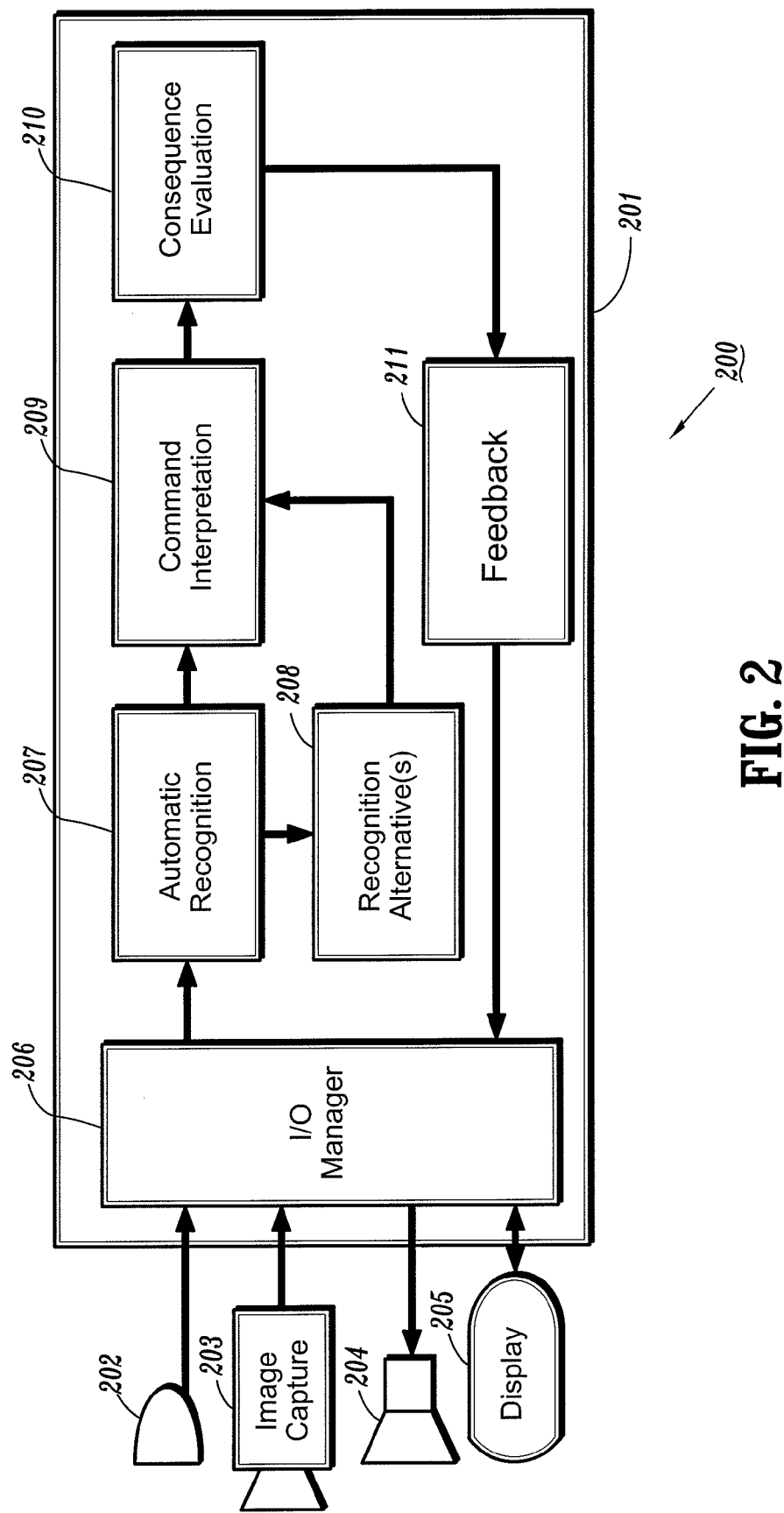
FIG. 2 is a block diagram illustrating an automated system for processing user commands according to an exemplary embodiment of the invention.

Referring now to FIG. 2, a block diagram illustrates a system (200) for processing user commands in an automated system according to an exemplary embodiment of the invention. In general, the system (200) comprises a command processing module (201) that can receives input requests, commands, data, etc., through various input devices including a microphone (202) (for voice commands), an image capture device (203) (for inputting images of desired objects, capturing facial features, mouth motion, etc.) and a display (205) (for inputting GUI-based commands). The system (200) comprises a plurality of output devices including a speaker (204) (for audio output) and the display (205).

The command processing module (201) comprises an I/O manager module (206), an automatic recognition module (207), a recognition alternatives module (208), a command interpretation module (209), a consequence evaluation module (210) and a feedback module (211), exemplary functions of which will be explained hereafter. The command processing module (201) may be implemented as a front-end component of any automated/intelligent system to protect against execution of miss-interpreted user commands that can result in bad, dangerous or otherwise undesirable and unintended consequences. The command processing system (201) will pass command processing results to a command execution system of the automated system for execution of those input commands that are screened and deemed acceptable by the command processing system (201).

The I/O manager module (206) performs functions such as managing the I/O data that is input and output to the various I/O devices (202~205). The module (206) may further implement methods for preprocessing input data (e.g., A/D conversion of audio input, formatting of input image data, etc.) and processing output data (e.g., TTS (text-to-speech) conversion, audio playback, rendering display pages according to modality of GUI, etc.).

The automatic recognition system (207) may be any system that automatically recognizes user input. For example, the automatic recognition system (207) may include methods for ASR (automatic speech recognition), NLU (natural language understanding), speaker identification, VR (visual recognition), or other types of pattern recognition (e.g., handwriting recognition) known in the art. Further, the automatic recognition system (207) may implement methods for user state recognition (e.g., attention, tiredness, stress) or providing cognitive workload estimation. The types of recognition systems that are implemented in module (207) will be depend on the application supported by the command processing module (201).

The recognition alternatives module (208) is a system that chooses recognition alternatives of an input command or data. For example, in one exemplary embodiment where the recognition module (207) performs speech recognition or natural language understanding, the recognition module may output the recognition result for a given voice command, while the module (208) determines several variants of how the voice command can be interpreted to generate what is known in the art as an n-best list that lists the n most likely results together with a likelihood or confidence measure. It is to be understood that the modules (207) and (208) are illustrated as separate modules for purposes of illustration, but such modules may be integrally combined.

The command interpretation module (209) receives the recognition results (including recognition alternatives, if any) and processes such results to interpret the request in the context of the allowable commands for the given application. The command interpretation module (209) can implement methods that are known in the art to associate the recognition results with allowable commands so that the necessary functions can be called for executing the interpreted command. It is to be understood that command interpretation can be automatic, or semiautomatic with some human assistance. For instance, the command interpretation module (209) may implement known dialog management methods that can query a user for information needed to interpret the command.

The consequence evaluation module (210) receives the command interpretation results output from the command interpretation module (209) and evaluates consequences of executing the interpreted commands. As noted above, in accordance with exemplary embodiments of the invention, a consequence evaluation process can be based on various factors such as hypothetical results or hypothetical results evaluated in real-time against actual environmental conditions, and such evaluation process will vary depending on the application environment. Exemplary methods for consequence evaluation according to the invention will be described with reference to FIG. 3, for example.

The feedback module (211) includes methods for, e.g., processing the results of the consequence evaluation and generating feedback, such as user queries, to ensure that the command or request was interpreted correctly. Such feedback may be in the form of audio feedback that is output via the speaker (204) or GUI feedback presented via the display (205). For example, in one exemplary embodiment of the invention, the feedback module (211) may implement the methods discussed above with reference to FIG. 1, step 106, to take preventative actions for execution of input commands that could result in undesirable consequences if executed. In other exemplary embodiments, methods for implementing the feedback module (211) according to the invention will be described with reference to FIG. 4, for example.

Figure 3:
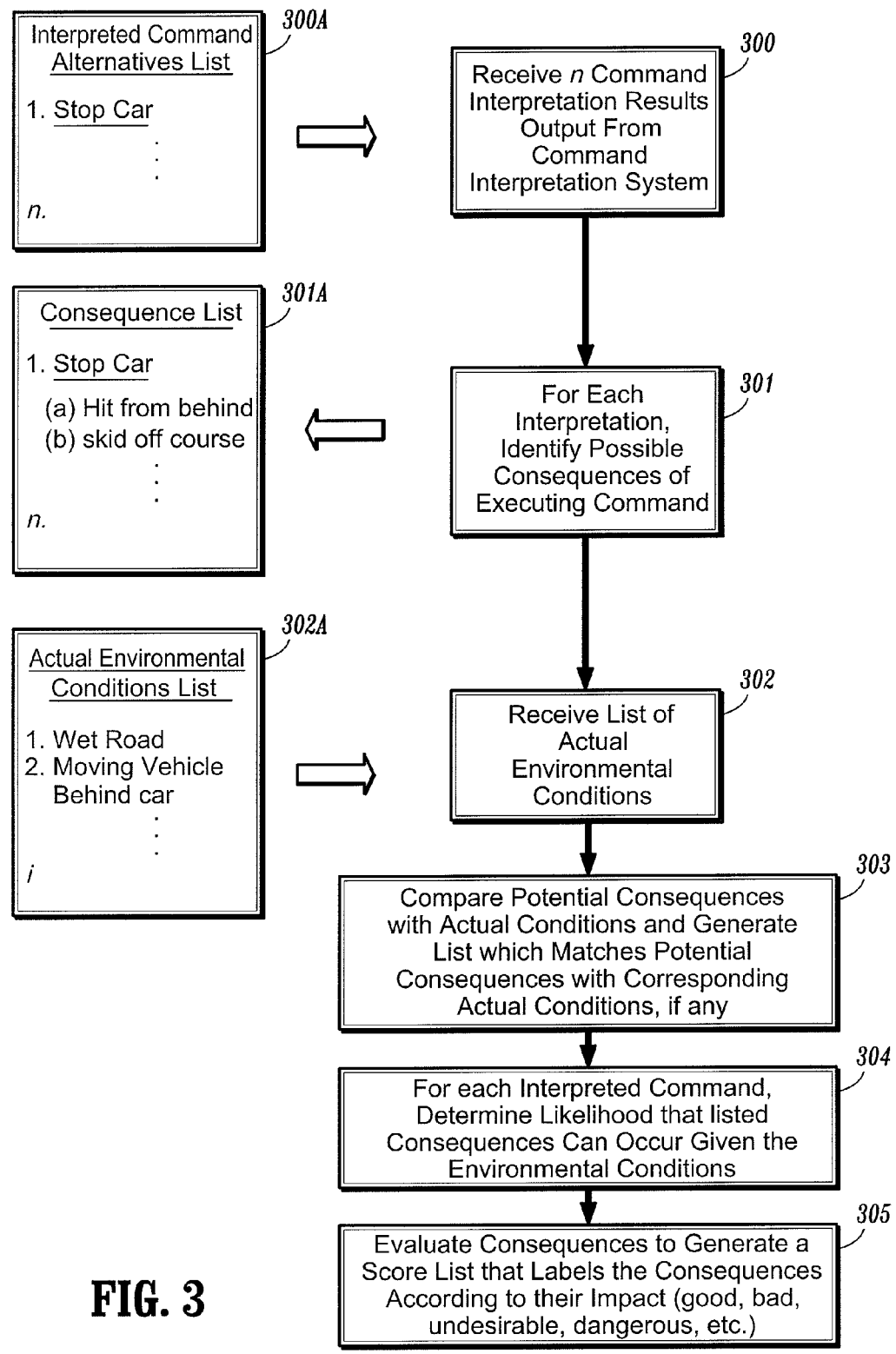
FIG. 3 is a flow diagram illustrating a method for consequence evaluation according to an exemplary embodiment of the invention.

FIG. 3 is a flow diagram that illustrates a method for consequence evaluation according to an exemplary embodiment of the invention. In one exemplary embodiment of the invention, the methods described hereafter for evaluating consequences of command execution may be implemented in module (210) of FIG. 2. In another exemplary embodiment, the methods of FIG. 3 may be implemented for steps 103 and/or 104 in FIG. 1. For purposes of illustration, FIG. 3 will be described with reference to the exemplary system of FIG. 2 and in the context of a system for controlling functions in a car based on driver commands.

Referring now to FIG. 3, the exemplary method commences by the consequence evaluation module (210) receiving the command interpretation results output from the command interpretation module (209) (step 300). The interpretation results may comprise a list of n alternative interpretations of a given voice command. As noted above, because there can be several different interpretations of a given command which have different likelihoods (some interpretations have higher likelihood and some have lower likelihood), a list of n interpreted command alternatives can be generated. For example, FIG. 3 depicts an exemplary interpreted command alternatives list (300A) which can be the input data in step 300. The exemplary list (300A) illustrates a first (most likely) interpreted command as being "stop car", followed by a plurality of alternative interpretations.

Next, for each interpreted command, the module will identify possible consequences of executing the command (step 301). By way of example, FIG. 3 depicts an exemplary consequences list (301A) that is generated (in step 301), where the possible consequences for executing the command "stop car" include, e.g., (a) being hit from behind, (b) skidding off course, etc. In other words, in the context of the given application, hypothetical situations (that can occur in principle) are determined for each of the n interpreted command alternatives.

The consequence evaluation method further receives real-time information regarding actual environmental conditions that may be relevant with regard to consequence evaluation (step 302). For instance, in the exemplary car function control application, various conditions such as road conditions (wet/dry road) or surrounding objects (e.g., moving vehicle behind driver's car) are identified and input to the evaluation process. For instance, FIG. 3 depicts an exemplary environmental conditions list (302A) that lists i relevant conditions (including wet road, existence of car behind driver's car). In this regard, various sensors may be implemented for collecting actual environmental conditions using known systems and methods.

The consequence evaluation method then compares the potential (hypothetical) consequences (e.g., list 301A) with the actual environmental conditions (e.g., list 302A) to match potential consequences with corresponding actual conditions, if any (step 303). For example, for the interpreted command "stop car", the potential consequence of "hit from behind" can be associated with the actual condition of "moving vehicle behind car" and the potential consequence "skid of course" can be associated with the actual condition "wet road". The output of this process is a list that matches hypothetical situations and real environment situations.

Thereafter, for each interpreted command, a determination is made as to the likelihood that the potential (hypothetical) consequences can occur given the corresponding actual conditions, if any (step 304). In other words, this process determines a likelihood of whether a potential consequence may or may not occur given current conditions. For instance, if the command "stop car" has a consequence of "skidding of course", the likelihood of such consequence occurring by executing the "stop car" command will be very low, or non existent, if at the time of the command, the car is moving very slow. In the context of a car control application, the methods of steps 301~304, for example, may be implemented using the methods described in U.S. Pat. No. 6,792,339, entitled "Artificial Passenger with Condition Sensors", which is commonly assigned and fully incorporated herein by reference.

The results of such processing (step 304) is a list of the n interpreted command alternatives with a likelihood measure for each associated potential consequence that provides an indication of the likelihood that such consequence may actually occur given the current real-time conditions. These results can then be further evaluated to generate a score list that labels/classifies each consequence for each interpreted command according to the impact of such consequence (e.g., good, desirable, bad, undesirable, dangerous, neutral, etc.) (step 305).

Based on the consequence evaluation results, the process can determine what course of action to take with respect to executing the command. For instance, if the most likely (primary) interpreted command does not have consequences that are classified as being undesirable, bad or dangerous, for example, the system may proceed to execute the command, even if such command was deemed ambiguous. Indeed, even if such command was incorrectly interpreted, the consequences of executing the command will not provide adverse results. In such instance, processing may continue as per steps 104, 105, 106 and 107, as described with reference to FIG. 1.

Figure 4:
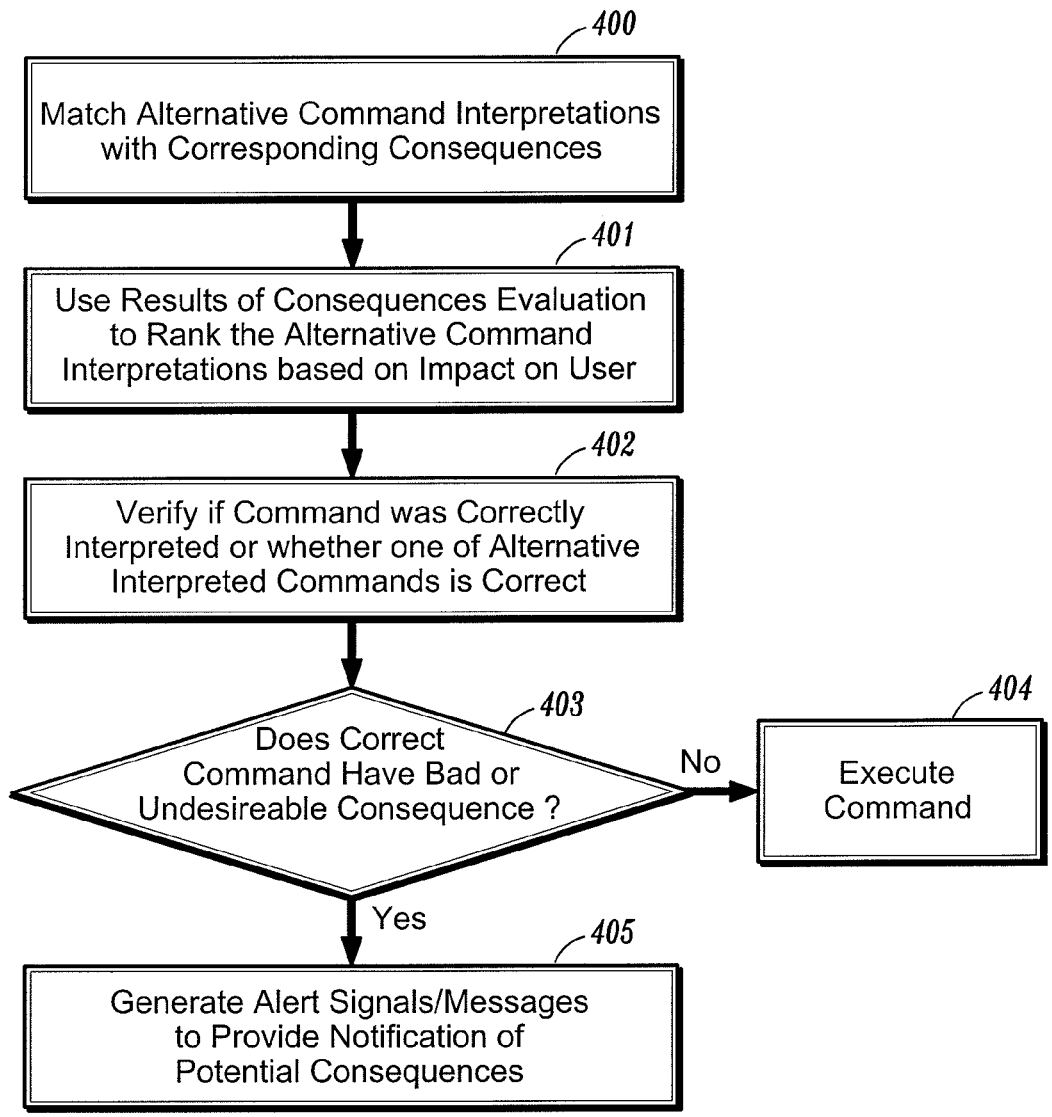
FIG. 4 is a flow diagram illustrating a method for performing preventative actions for executing user commands according to an exemplary embodiment of the invention.

FIG. 4 is a flow diagram illustrating a method for performing preventative actions for executing user commands according to an exemplary embodiment of the invention. For example, FIG. 4 illustrates methods for providing feedback to determine whether a given command was correctly interpreted. In one exemplary embodiment of the invention, the methods described hereafter for providing feedback may be implemented in module (211) of FIG. 2. In another exemplary embodiment, the methods of FIG. 4 may be implemented for steps 105 and/or 106 in FIG. 1. For purposes of illustration, FIG. 4 will be described with reference to FIGS. 2 and 3 in the context of a system for controlling functions in a car based on driver commands.

Referring to FIG. 4, the alternative interpreted commands are matched to corresponding consequences (as classified via the method of FIG. 3) (step 400). The results of the consequence evaluation (FIG. 3) are used to rank the alternative interpreted commands by their impact on the user—by their consequences (step 401).

Next, the system will attempt to verify if the (most-likely) command was correctly interpreted or whether one of the alternative interpreted commands was the correct (user intended) command (step 402). This process may be implemented using various methods. For instance, in one exemplary embodiment, user queries/questions may be automatically compiled to ask the user whether the given command was interpreted correctly. The question may be presented to the user in visual form (via display) or audio form (via spoken output from speaker) or using other modes.

By way of further example, questions can be compiled in such a way that the confirmation or rejection of as many alternative interpreted commands as possible could be received. For example, one question could request confirmation for two or three alternative commands. A question may relate to a class of alternatives. For instance, a question may be "Are you talking about turning on a device?", and if the question defines the class of alternatives, the question can pose a specific question inside the class such as "Are you asking to turn on a window". In one exemplary embodiment of the invention, methods for resolving decoding ambiguity and formulating questions may be implemented using the methods described in U.S. Pat. No. 6,587,818 entitled "System and Method for Resolving Decoding Ambiguity via Dialog", which is commonly assigned and fully incorporated herein by reference.

In other exemplary embodiments of the invention, a verification process (step 402) may be implemented using methods that process multi-modal data which is received from additional sources of information. For example, assume a voice command was processed using speech recognition and the recognition results are deemed ambiguous, data from a visual speech system can be used to verify the command using a visual interpretation of what the user spoke, using methods known in the art.

In another exemplary embodiment of the invention, the methods for compiling questions can use additional multi-modal data to help formulate questions. For example, a visual interpretation of what a user spoke could be used to formulate questions regarding commands that the command processing system thinks the user actually uttered based on results of the visual interpretation, using methods known in the art.

When the correct command is verified (step 402), a determination is made as to whether such command may have "dangerous", "bad" or "undesirable" consequences (step 403). It is to be understood that the "correct command" may be deemed to be the most likely interpreted command in the circumstance that verification of the command is not obtained. If it is determined that the correct command does not have undesirable, bad or dangerous consequences (negative determination in step 403), the command may be executed (step 404). On the other hand, if it is determined that the correct command has undesirable, bad or dangerous consequences (affirmative determination in step 403), the system may generate alert signals or messages to provide notification of the potential consequences (step 405).

The notification process (step 405) may be implemented using various methods to inform a user or other people about possible consequences of the actions that can follow from miss-recognition of user commands/requests. For example, if the command was to "stop car", the system can generate signals to flash a lamp to inform a driver in a car and other drivers behind the car that the car will being stopping shortly thereafter. By way of further example, if an ambiguous user command to "send an e-mail note to [a given] address" has undesirable consequences of being sent to the wrong (misinterpreted) address, the system can send the e-mail note but add a comment in the note for another person to whom the note was sent to provide notice that the note may have been sent to the wrong address. In other exemplary embodiments of the invention, when the execution of the command can result in a dangerous consequence, the system can generate a notification or alert to the user that the command is rejected (even if confirmed by the user) and provide some indication as to the dangerous consequences to justify the rejection of the command.

Although exemplary embodiments of the present invention have been described herein with reference to the accompanying drawings, it is to be understood that the invention is not limited to the exemplary embodiments, and that various other changes and modifications may be affected therein by one skilled in the art without departing from the scope or spirit of the invention. All such changes and modifications are intended to be included within the scope of the invention as defined by the appended claims.

What is claimed is:

1. A program storage device readable by a command processing system comprising a processor, the program storage device embodying a program of instructions executable by the processor to perform method steps for processing commands in an automated system, the method steps comprising:
   receiving a user command;
   processing the user command;
   evaluating consequences of executing the user command based on command processing results, wherein evaluating consequences of executing the user command comprises determining a potential consequence of executing the user command, determining a likelihood that the potential consequence can actually occur, and classifying an impact of the potential consequence based on the determined likelihood that the potential consequence can actually occur; and
   performing a preventative action if it is determined that execution of the user command could result in an undesirable consequence.

2. An automated system, comprising:
   a command processing system that processes input commands; and
   a command execution system that executes an input command based on command processing results provided by the command processing system,
   wherein the command processing system evaluates consequences of executing input commands and take preventative actions for execution of input commands that could result in undesirable consequences, and wherein the command processing system, comprises:
   an automatic recognition system for recognizing input patterns associated with the input command;
   a command interpretation system to interpret input commands based on recognition results generated by the automatic recognition system;
   a consequence evaluation system to determine a potential consequence of executing input commands based on interpretation results generated by the command interpretation system and determine a likelihood that the potential consequences can occur; and
   a feedback system to perform preventative actions for executing input commands when consequence evaluation results of an input command indicate at the likelihood of the potential consequence is greater than a threshold, wherein the potential consequence is an undesirable consequence of executing the input command.

3. The system of claim 2, wherein the command processing system further comprises an ambiguity evaluation system to determine a degree of ambiguity of recognition results or interpretation results of an input command.

4. The system of claim 3, wherein the means for determining likelihood comprises:
   means for receiving information that indicates current environmental conditions;
   means for determining a relation, if any, between the potential consequence and the current environmental conditions; and
   means for determining a likelihood that the potential consequence can actually occur based on related current environmental conditions, if any.

5. The system of claim 2, wherein the feedback system comprises a notification system to generate an alert signal or notification message to provide notification of the undesirable consequence of executing an input command.

6. The system of claim 2, wherein the feedback system comprises a query compiler to generate a user query to obtain clarification of an input command.

7. The system of claim 6, wherein the query compiler compiles a question to request user confirmation of an input command as interpreted or an alternative interpretation of the input command.

8. The system of claim 2, wherein the automatic recognition system comprises a speech recognition system.

9. The system of claim 2, wherein the automatic recognition system comprises a natural language understanding system.

10. The system of claim 2, wherein the automatic recognition system comprises an image recognition system.

11. The system of claim 2, wherein the automatic recognition system comprises a user state recognition system.

* * * * *